March 3, 1959 W. B. SULMONETTI 2,875,753
SURGICAL TRACTION APPARATUS FOR HOSPITAL BEDS
Filed Jan. 28, 1954 3 Sheets-Sheet 1
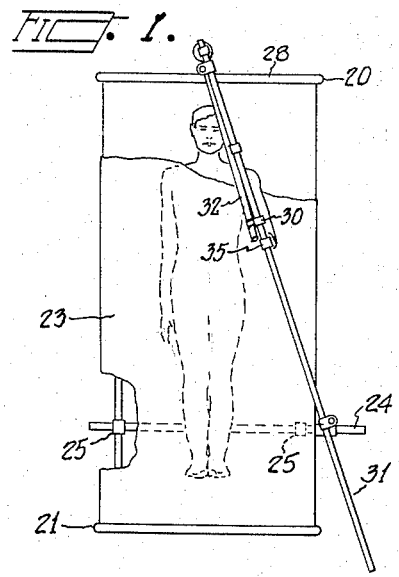
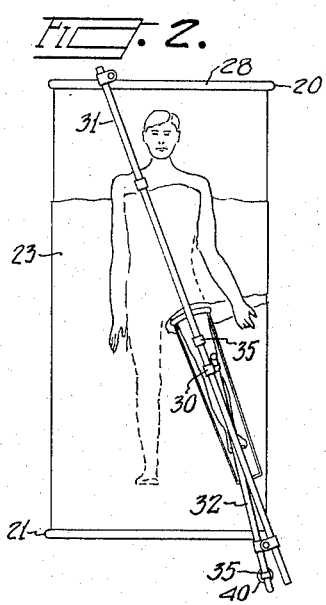
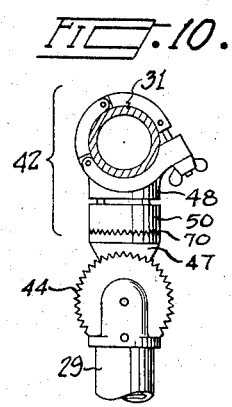
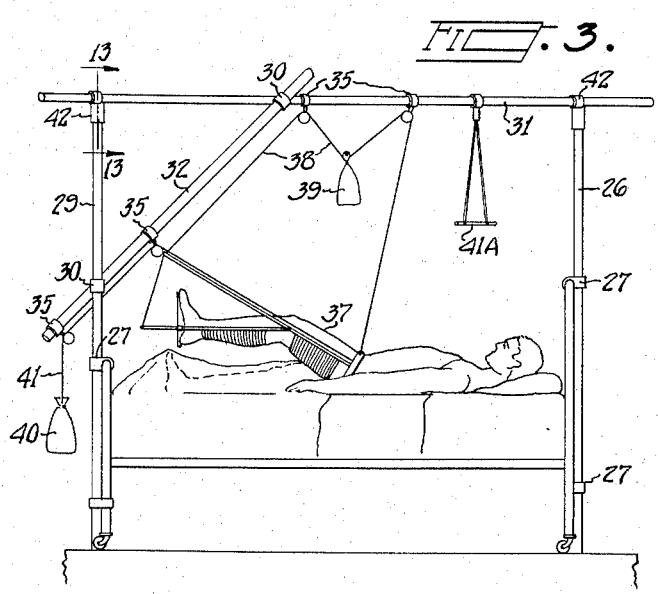
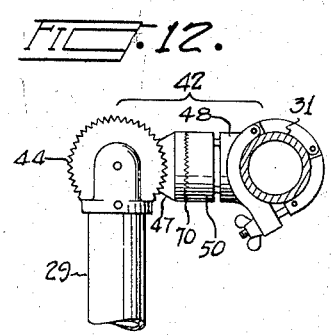
INVENTOR
WILLIAM B. SULMONETTI
ATTORNEY March 3, 1959 W. B. SULMONETTI 2,875,753
SURGICAL TRACTION APPARATUS FOR HOSPITAL BEDS
Filed Jan. 28, 1954 3 Sheets-Sheet 2
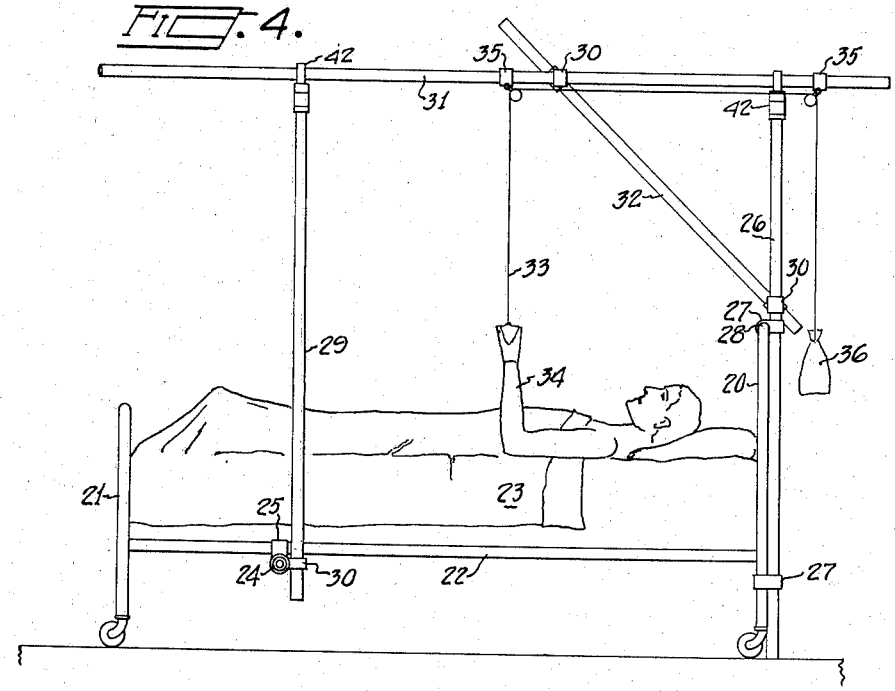
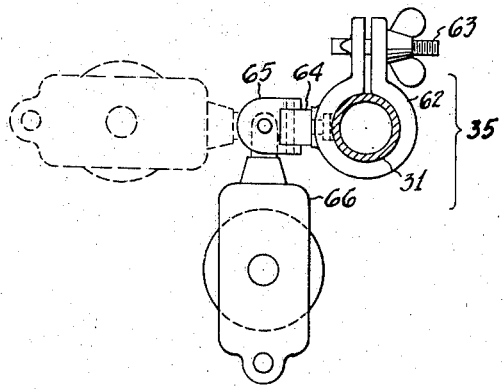
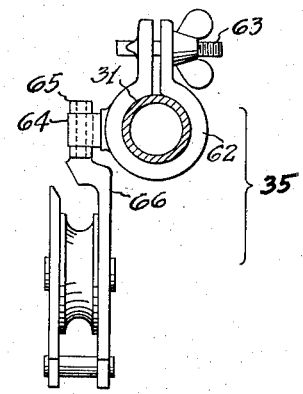
INVENTOR
WILLIAM B. SULMONETTI

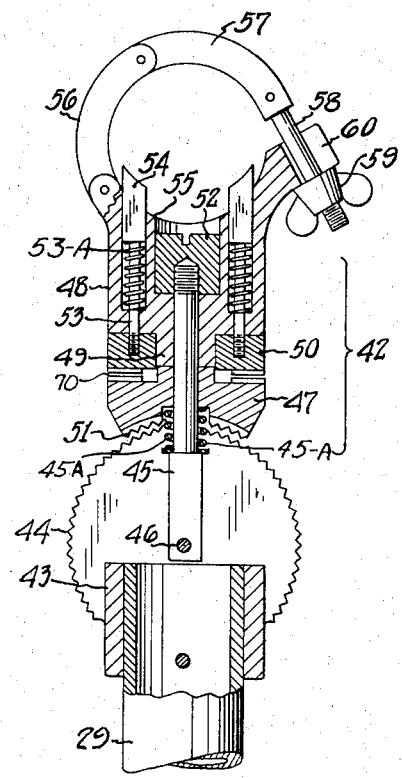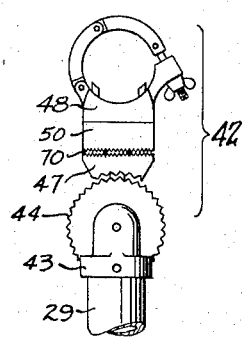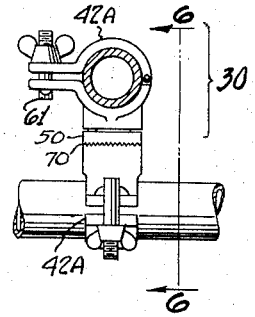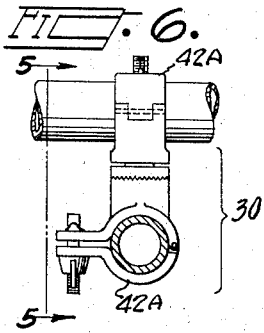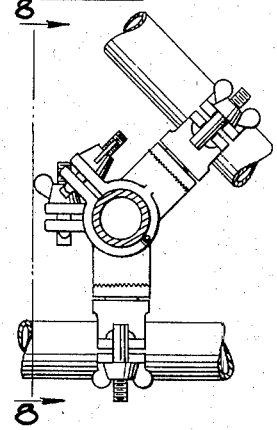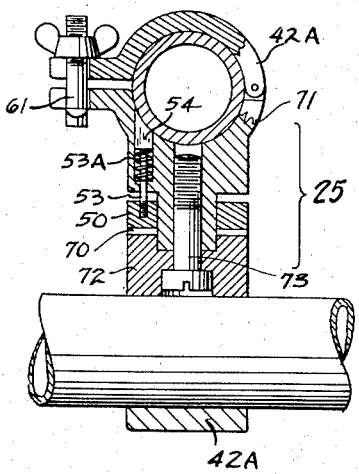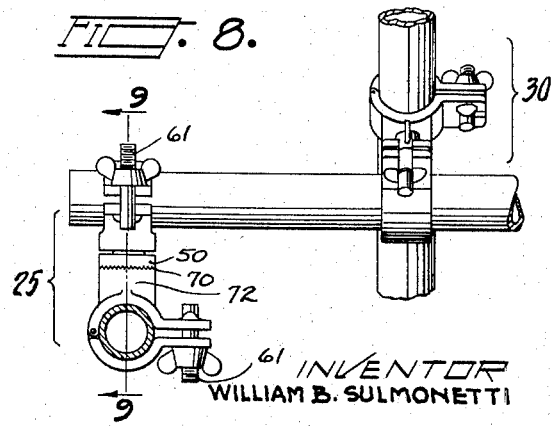

United States Patent Office 2,875,753
Patented Mar. 3, 1959

2,875,753

SURGICAL TRACTION APPARATUS FOR HOSPITAL BEDS

William B. Sulmonetti, Oakland, Calif.

Application January 28, 1954, Serial No. 406,719

10 Claims. (Cl. 128—84)

This invention relates generally to surgical apparatus and particularly to a surgical traction apparatus for hospital beds.

The main object of this invention is to provide a traction apparatus composed of the minimum number of parts and at the same time making it adaptable to any type of bed and traction requirements.

A further object is to provide a traction apparatus which will not involve an elaborate frame work to support the pulleys in the many possible positions in which they may be required to function.

A still further object is to provide a special form attachment between the pulleys and the supporting members.

I accomplish these and other objects in the manner set forth in the following specification as illustrated in the accompanying drawings, in which Fig. 1 is a plan view showing a representative way of applying traction to an arm.

Fig. 2 is a plan showing the position of the apparatus when applying traction to a leg.

Fig. 3 is a side elevation showing traction being applied to the upper leg and hip.

Fig. 4 is a side elevation showing traction applied to a forearm in a vertical direction.

Fig. 5 is a section taken along the line 5—5 in Fig. 6, showing one of the clamps.

Fig. 6 is a section taken along the line 6—6 in Fig. 5.

Fig. 7 is a fragmentary view showing two of the multiple clamping devices.

Fig. 8 is a view taken along the line 8—8 in Fig. 7, showing how the clamping devices may be used.

Fig. 9 is a sectional view taken along the line 9—9 in Fig. 8, showing at a larger scale the details of the clamp.

Fig. 10 is a fragmentary view of a modified form of clamp, showing the use of the friction clamp.

Fig. 11 is similar to Fig. 10 but showing the use of locking pins.

Fig. 12 is a side elevation showing the device illustrated in Fig. 10 turned through 90°.

Fig. 13 is an enlarged section showing the detail of the means for holding a clamp against rotation.

Fig. 14 is a side elevation of a combined pulley and clamp.

Fig. 15 is similar to Fig. 14 but showing the pulley turned through 90° and swung to one side.

Like numbers of reference refer to the same or similar parts throughout the several views.

Referring in detail to the drawings there is shown a portion of a common form of hospital bed including head posts 20, the foot posts 21 and side rails 22. Bedding 23 is also indicated.

Referring particularly to my invention, it is comprised of a cross bar 24 which is tubular in form and is clamped to the side rails 22 by means of clamps 25. The bar 24 is between the head posts 20 and the foot posts 21.

As used in Figs. 1 and 4 there is employed an upright post 26 which is clamped to the head posts 20 by means of the clamps 27 which permit the union of the member 26 to the head post 20, either along the vertical posts or inclined with relation thereto or to the cross members 28 which join the posts 20. To one end of the cross bar 24 is attached an upright post 29 by means of a clamp 30.

Across the top of the posts 26 and 29 is a rail 31 which is secured to the posts 26 and 29 by clamps.

In order to give rigidity to the structure and also to provide anchors for clamps and blocks, there is provided a brace bar 32 which is secured to the post 26 or 29 and the rail 31 by clamps 30.

The positions these parts may assume are unlimited and the description of Figs. 1 and 4 is only by way of example.

In this case it is desired to apply traction to the forearm so the parts 26, 29 and 31 are moved until a vertical line 33 passing along the forearm 34 will pass over the sheave supported by the clamp 35. The line 33 is led along the rail 31 to a pulley in the second clamp 35 and thence down to the weight 36.

In the form shown in Figs. 2 and 3, the brace 32 is attached to the post 29 which is moved to the line of the foot posts 21. In this case where traction is applied to the upper leg portion, a pulley 35 is disposed along the brace 32 at a point in alignment with the axis of the upper leg 37. Traction is provided by passing the line 38 through a second pulley 35 and then fastening it to a point on the patient near the hips. A weight 39 is suspended by a pulley from the line 38 between the two pulleys 35. Axial traction is provided by a weight 40 attached to a line 41 which passes over a pulley 35 on the outboard end of the brace 32, thence to a second pulley 35 and thence to the limb 37 near the knee. Hand grips 41A may be suspended from the rail 31.

It will be noted that the traction may be applied in any desired direction by merely adjusting the position and relation of the various parts. While several styles of clamps are illustrated they are interchangeable and the one selected is the one best adapted for a particular location.

The clamps 30, for example, are shown in Fig. 6, in which the hinged clamp members 42A engage the posts 26 or 29 or rail 31, as the case may be.

The clamp 42 in Fig. 13 provides angular adjustment and a means for locking the clamp in a desired angular position. In clamp 42, for example, the post 29 has mounted on its upper end a cap 43 provided with serrations 44 which form part of a cylinder. A stem 45, on which is a spring 45A, is secured to the cap 43 by means of a pin 46. Stem 45 extends through the jaw 47 into the body 48 on which is formed a hub 49 on which is slidably mounted the jaw ring 50. Jaw 47 has teeth 51 which can mesh with the serrations 44 on the cap 43.

The body 48 is held in place by a nut 52 on the stem 45. Plungers 53 are anchored in the ring 50 and have compression springs 53A thereon against which are placed the angled tips 54. The end of the body 48 has an arcuate saddle 55 through which the tips 54 project. Arcuate clamps 56 and 57 are fastened in series to one side of the saddle 55 and by means of a bolt 58 and wing nut 59 to the slotted end 60 of the saddle 55. Then when any tubular member is placed in the saddle 55 and held down by the clamps 56 and 57, the tips 54 are forced down. The ring 50 is held against rotation with relation to the body 48 by the plungers 53. Jaw 47 and ring 50 are equipped with mating radial teeth 70. When the tips 54 are forced down, as described, the ring 50 is depressed into locking engagement with jaw 47 and the latter is in turn depressed into locking engagement with serrations 44. Thus, relative rotation in any direction between the cap 43 and clamp body 48 is prevented when the clamp members 56, 57 are tightened on a tube to hold the tips 54 depressed. The locking parts are shown in clamped position in Figures 10 and 12, and in unclamped position in Figures 11 and 13.

Clamps 30 shown in Figs. 5 and 6 are simple clamps for uniting two tubes with a pivotal connection. Each clamp portion is held to its tube by a split section through which passes a bolt 61. Clamp 30 is similar to the clamp 25 which is illustrated in detail in Figure 9. Certain parts correspond to those already described in the clamp 42 and are identified by the same reference numerals. The clamp 25 comprises a pair of clamp body members 71 and 72 pivotally interconnected by a bolt 73. When a tube is engaged by the upper hinged clamping member 42A to depress the tip 54, the ring 50 is projected into locking engagement with the lower clamp body 72 by reason of the mating teeth 70 on ring 50 and body 72. When the upper hinged clamping member 42A is released so that the tip 54 can be projected upwardly, the ring 50 is raised out of locking engagement with the lower clamp body 72 by the action of spring 53A, whereupon the two clamp bodies 71 and 72 may swivel relative to each other on the bolt 73.

Figs. 14 and 15 illustrate the combined clamp and pulley 35 in which a split clamp portion 62 is held on to a tubular member, such as the rail 31, by means of a bolt 63. Pivotally attached to the clamp portion 62 is a swivel stud 64. To the swivel stud 64 is pivotally attached a clevis 65 from which is pivotally swung a pulley block 66. In the position of clamp 62 shown in Figs. 14 and 15 stud 64 swivels on a horizontal axis perpendicular to rail 31. Clevis 65 has a pivot pin in a transverse hole in stud 64 allowing the clevis to swing on a vertical axis, as from its Fig. 14 position in the plane of the view to its Fig. 15 position perpendicular to the plane of the view. Pulley block 66 has pivotal connection with clevis 65 on a horizontal axis which is perpendicular to both previously mentioned axes in Fig. 14 allowing the pulley block to swing vertically between its solid line and broken line positions. Stud 64 is in the same position in Figs. 14 and 15.

From the foregoing it can be seen that the line of traction may be accurately controlled by a simple adjustment of the relative positions of the supporting members 26, 29, 31 and 32 and the mounting of the various pulley and clamps thereon.

This leaves the maximum freedom for the surgeon and reduces the time required for a set up and also the amount of apparatus required.

I claim:

1. A traction apparatus of the class described comprised of a cross bar having clamps attaching it transversely at intermediate points under bed side rails, a post disposed at one end of said bar, an adjustable clamp securing said post to said bar, a second post mounted behind the head end of said bed and clamped thereto, a rail disposed across the upper ends of said posts, clamps holding said rail to said posts, an inclined brace bar having adjustable clamps attaching it to said rail and one of said posts, and a plurality of pulley blocks having clamps attaching said blocks to portions of said rail and brace bar, and a weighted line passing around said pulleys to the point of traction.

2. In a surgical traction apparatus of the kind described, a multiple clamping device comprising associated clamping sections in swivelled connection with each other, a locking device fixed upon one of said sections, a cooperating locking device movably mounted upon the other section of said multiple clamping device, operating means normally maintaining said movable locking device out of engagement with said fixed locking device, whereby said clamping sections are adjustable relatively to each other, and clamping means on each of said sections for clamping the latter upon associated rods to position the latter in predetermined relation to each other, said operating means being automatically operated as said one clamping section is clamped upon a rod to automatically force said movable locking device into operative engagement with said fixed locking device to thereby lock said clamping sections in adjusted positions and to coincidentally fix the clamped rods in said predetermined relation to each other.

3. In a surgical traction apparatus an upright post, a cap on said post, an arcuate member on said cap having serrations formed in the arcuate surfaces, a stem pivoted to the center of said member, a spring on said stem, a jaw slidable on said stem having serrations on one face mating with the serrations on said member, said serrations being urged apart by said spring, said jaw having radial teeth formed on the other side thereof, a body mounted on said stem, a radial toothed jaw ring slidable with relation to said body and having teeth engageable with said jaw teeth, pins in said jaw ring slidable in said body, springs on said pins urging said jaw ring away from said jaws, the outermost end of said body terminating in a circular clamp for the reception of a tube, the outer ends of said pins being curved to conform with the circle of said clamp and to be held in a clamping position in which the serrations on said member engage the serrations on said jaw when said clamp is occupied by a tube and said pins are forced outwardly thereby.

4. In a surgical traction apparatus of the class described, the combination of a pulley block, a clamp for attaching the block to a tubular support, and a universal connection between said clamp and block permitting rotation on an axis normal to the axis of said tube and on two axes normal to each other and normal to said first mentioned normal axis, said universal connection comprising a swivel block pivotally connected with said clamp for rotation normal to said tube, a clevis pivotally connected with said swivel block for rotation on an axis normal to said swivel axis, and a pivotal connection between said clevis and pulley block for rotation of the pulley block on an axis normal to the axis of rotation of said clevis.

5. A traction apparatus of the class described comprising a pair of upright posts, clamp means for attaching said posts to a bed, a horizontal rail member extending between upper portions of said posts, clamps rigidly connecting said rail member with said posts, an inclined brace member between said rail member and one of said posts, clamps rigidly connecting said brace member with said rail member and said one post, and traction pulleys movably mounted on said members.

6. A traction apparatus of the class described comprising a cross bar having clamps for attaching the cross bar transversely under bed side rails at intermediate points along the rails, a post disposed at one end of said bar, a clamp securing said post to said bar, a second post, clamp means on said second post for attaching said second post to one end of a bed, a horizontal rail member clamped to the upper ends of said posts, an inclined brace member extending between said rail and one of said posts, adjustable angle clamps securing said brace member to said rail member and post, and traction pulleys clamped to said members.

7. In a surgical traction apparatus, a bar, a cap on one end of said bar having an arcuate serrated member, a bar clamp having a body member pivotally connected with said serrated member for rotation about an axis normal to said bar, a swivel joint in said body member for rotation of the clamp about an axis normal to said pivotal axis, said body member having a serrated portion in said joint, a movable jaw member in said joint having serrations on one side to engage said arcuate serrated member and serrations on its opposite side to engage said clamp body member in said joint, and means operable by another bar secured in said clamp for moving said jaw member into locking engagement with said arcuate member and said clamp body member.

8. In a surgical traction apparatus, an adjustable angle multiple clamp comprising a pair of pipe clamps joined by a swivel connection, a serrated surface on one of said clamps in said swivel connection, a movable member on the other clamp having a serrated surface in said swivel connection engageable with said first serrated surface, spring means in other other clamp operable on said movable member for holding said surfaces apart, and means connected with said movable member engageable by a pipe in clamped position in said other clamp for pressing said serrated surfaces together to lock said swivel joint.

9. An adjustable angle pipe clamp device for rigidly connecting a pair of pipes together in any desired angular relationship, comprising a pair of pipe clamps; each clamp comprising a first curved jaw member having a hinge on one end and fastening means on its other end and an aperture intermediate said ends, and a second curved jaw member connected with said hinge and having fastening means cooperating with said first fastening means to clamp a pipe between said jaw members; a swivel connection between said first jaw members of the two clamps comprising a swivel pin extending through said apertures, said first jaw members of both clamps having flat surfaces around said pin perpendicular to said pin and held close together and in parallelism by said pin, and swivel locking means having a portion engageable by a pipe in one of said clamps and an annular surface concentric with said pin engageable with one of said first jaw members.

10. An adjustable angle pipe clamp device for rigidly connecting a pair of pipes together in any desired angular relationship, comprising a pair of pipe clamps; each clamp comprising a first arcuate jaw member having a pipe clamping surface, a hinge on one end of said jaw member and fastening means on the other end of said jaw member, and a second arcuate jaw member having a pipe clamping surface, one end of said second jaw member being connected with said hinge and the other end having fastening means cooperating with said first fastening means to clamp a pipe between said jaw members; a swivel connection between said first jaw members of the two clamps, a serrated surface on one of said first jaw members concentric with said swivel connection, a serrated locking member movable on the other first jaw member into engaging and disengaging positions relative to said serrated surface, spring means urging said locking member toward said disengaging position, and means on said locking member projecting through the pipe clamping surface of said other first jaw member engageable by a pipe on said surface to move said locking member into said locking position.

References Cited in the file of this patent

UNITED STATES PATENTS

| | | |
|---|---|---|
| 179,764 | Briggs et al. | July 11, 1876 |
| 737,951 | McEachern | Sept. 1, 1903 |
| 1,718,046 | Hungerford | June 18, 1929 |
| 1,729,910 | Smallwood | Oct. 1, 1929 |
| 1,835,473 | Davidson | Dec. 8, 1931 |
| 1,964,930 | Siebrant | July 3, 1934 |
| 2,050,269 | Brooks | Aug. 11, 1936 |
| 2,053,753 | Wellington | Sept. 8, 1936 |
| 2,370,251 | Lewis | Feb. 27, 1945 |
| 2,718,886 | Sutton | Sept. 27, 1955 |

FOREIGN PATENTS

| | | |
|---|---|---|
| 367,023 | Great Britain | Aug. 14, 1931 |
| 423,320 | Great Britain | Jan. 30, 1935 |

OTHER REFERENCES

The Journal of Bone & Joint Surgery, for Oct. 1939, pp. 1932–4. (Copy in Scientific Library.)